United States Patent
Parry et al.

(10) Patent No.: US 7,304,757 B2
(45) Date of Patent: Dec. 4, 2007

(54) SYSTEM AND METHOD FOR SECURE PRINTING

(75) Inventors: Travis J. Parry, Boise, ID (US); Jose L. Cervantes, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 964 days.

(21) Appl. No.: 10/029,458

(22) Filed: Dec. 21, 2001

(65) Prior Publication Data

US 2003/0117640 A1 Jun. 26, 2003

(51) Int. Cl.
*G06F 15/00* (2006.01)
*H04L 9/18* (2006.01)

(52) U.S. Cl. .............. 358/1.15; 713/201; 380/242; 380/270; 380/51; 380/555; 726/26

(58) Field of Classification Search ........... 358/1.15; 713/201; 380/242, 270, 51, 55; 726/26
See application file for complete search history.

(56) References Cited

U.S. PATENT DOCUMENTS

| | | | | |
|---|---|---|---|---|
| 5,239,389 A * | 8/1993 | Kochis et al. | ......... | 358/451 |
| 5,873,077 A * | 2/1999 | Kanoh et al. | ......... | 707/3 |
| 5,970,228 A | 10/1999 | Nezu | | |
| 6,026,258 A * | 2/2000 | Fresk et al. | ......... | 399/87 |
| 6,111,953 A * | 8/2000 | Walker et al. | ......... | 380/51 |
| 6,181,436 B1 * | 1/2001 | Kurachi | ......... | 358/1.15 |
| 6,553,240 B1 * | 4/2003 | Dervarics | ......... | 455/566 |
| 6,567,180 B1 * | 5/2003 | Kageyama et al. | ......... | 358/1.15 |
| 6,650,431 B1 * | 11/2003 | Roberts et al. | ......... | 358/1.15 |
| 6,751,732 B2 * | 6/2004 | Strobel et al. | ......... | 713/176 |
| 6,963,419 B2 * | 11/2005 | Tanimoto | ......... | 358/1.15 |
| 6,965,958 B1 * | 11/2005 | Sugiyama | ......... | 710/104 |
| 6,992,235 B2 * | 1/2006 | Bode et al. | ......... | 800/21 |
| 6,996,235 B2 * | 2/2006 | Foth | ......... | 380/51 |
| 7,102,779 B2 * | 9/2006 | Lester et al. | ......... | 358/1.15 |
| 7,184,159 B2 * | 2/2007 | Bergstrand | ......... | 358/1.15 |
| 7,199,889 B2 * | 4/2007 | Miyano | ......... | 358/1.14 |
| 2001/0037462 A1 | 11/2001 | Bengston | | |

FOREIGN PATENT DOCUMENTS

| | | |
|---|---|---|
| EP | 0935182 | 8/1999 |
| EP | 1071254 | 1/2001 |
| EP | 1091275 | 4/2001 |
| EP | 1091285 | 4/2001 |

* cited by examiner

*Primary Examiner*—Douglas Q. Tran
*Assistant Examiner*—Chan S. Park

(57) ABSTRACT

The present disclosure relates to a system and method for secure printing. In one arrangement, the system and method pertain to receiving a document to be printed, determining that the document cannot be printed in its present form, transmitting the document to a computing device, and receiving a print ready version of the document from the computing device. In another arrangement, the system and method pertain to receiving a protected document from a printing device, unprotecting the document, and transmitting the unprotected document back to the printing device so that the printing device can generate a hard copy of the document.

17 Claims, 7 Drawing Sheets

SYSTEM AND METHOD FOR SECURE PRINTING

FIELD OF THE INVENTION

The present disclosure relates to a system and method for secure printing. More particularly, the disclosure relates to a system and method with which the printing of hard copy documents can be controlled by one or more authorized persons.

BACKGROUND OF THE INVENTION

Often times, persons wish to print sensitive documents, i.e., documents that they wish to remain private and do not wish to share with unauthorized persons. Unfortunately, there are few, if any, systems with which secure printing can be obtained where the printing device (e.g., printer) is used in a shared environment. Accordingly, users that print sensitive documents in shared environments typically send a print job to the printing device and rush to the device to gain possession of the hard copy document that is generated.

Clearly, several drawbacks exist to the aforementioned method of printing sensitive documents. For instance, if another person in the shared environment also has sent a print job to the printing device, that person may already be waiting at the printing device and therefore may see the sensitive document. Furthermore, a jam may occur prior to the printing of the sensitive document, increasing the chances of an unauthorized person viewing the document once the jam is cleared.

In view of the lack of secure printing systems and the drawbacks associated with present methods of printing sensitive documents, it can be appreciated that it would be desirable to have a system and method for secure printing.

SUMMARY OF THE INVENTION

The present disclosure relates to a system and method for secure printing. In one arrangement, the system and method pertain to receiving a document to be printed, determining that the document cannot be printed in its present form, transmitting the document to a computing device, and receiving a print ready version of the document from the computing device.

In another arrangement, the system and method pertain to receiving a protected document from a printing device, unprotecting the document, and transmitting the unprotected document back to the printing device so that the printing device can generate a hard copy of the document.

In a further arrangement, the system and method pertain to receiving an untranslated document from a printing device, translating the document into a print ready format, and transmitting the translated document back to the printing device so that the printing device can generate a hard copy of the document.

In yet another arrangement, the system and method pertain to receiving a document to be printed, determining that the document cannot be printed in its present form, and receiving a communication from a computing device that contains information that would facilitate printing of the document.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed is a system and method for secure printing. In the context of this disclosure, the term "printing" pertains to the act of generating hard copy documents. In that many different devices are capable of generating hard copy documents, it is to be understood that "printing" can be accomplished not only by a printer but also by substantially any other device configured for hard copy generation.

To facilitate description of the system and method, an example system will first be discussed with reference to the figures. Although this system is described in detail, it will be appreciated that this system is provided for purposes of illustration only and that various modifications are feasible without departing from the inventive concept. After the example system has been described, examples of operation of the system will be provided to explain the manners in which secure printing can be achieved.

Figure 1:
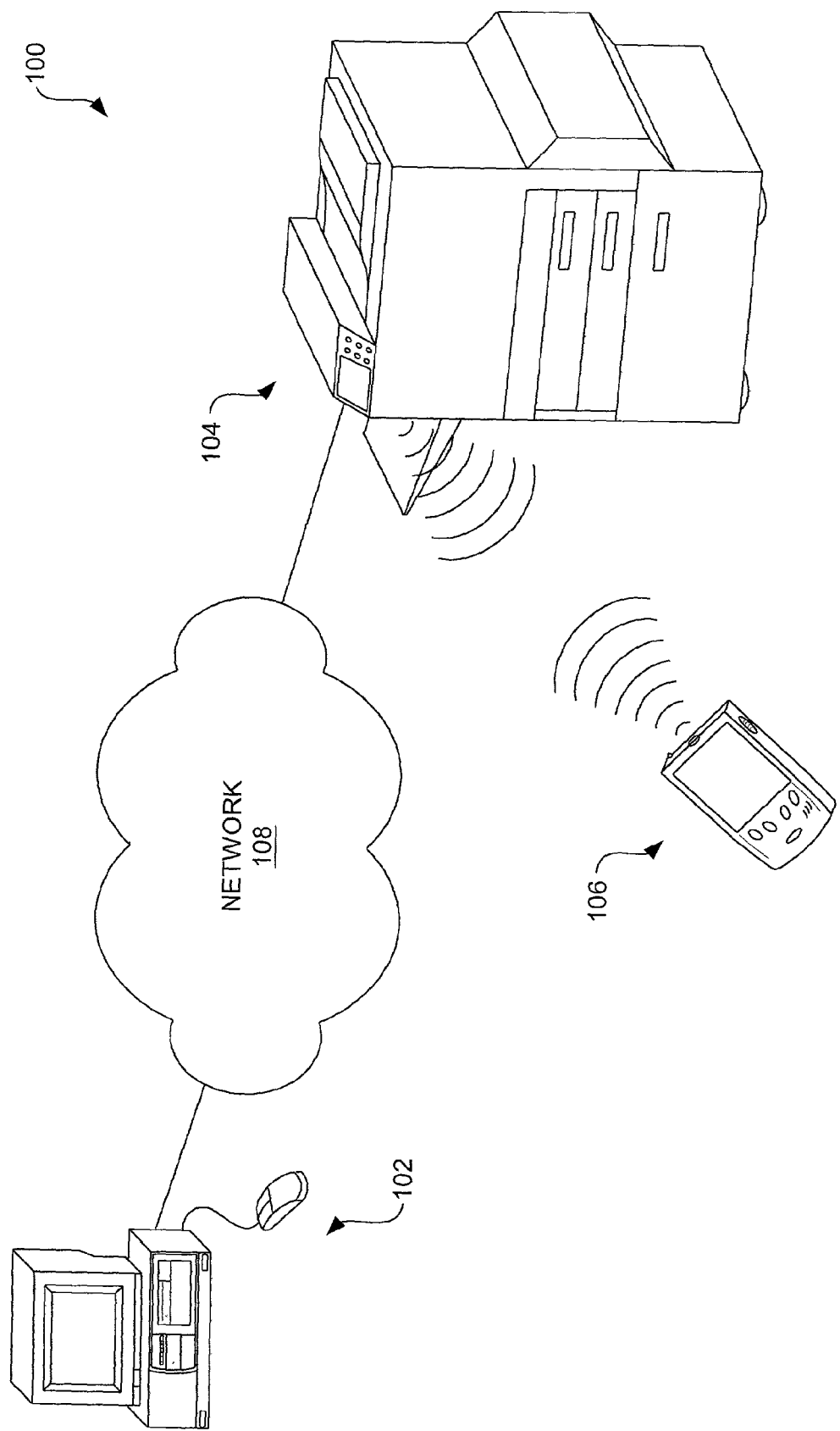
FIG. 1 is a schematic view of an example system.

Referring now in more detail to the drawings, in which like numerals indicate corresponding parts throughout the several views, FIG. 1 illustrates an example system 100. As indicated in this figure, the system 100 generally comprises a computing device 102, a printing device 104, and a portable computing device 106. As indicated in the figure, the computing device 102 can be arranged as a personal (PC) computer, the printing device 104 can be arranged as a printer, and the portable computing device 106 can be arranged as a personal digital assistant (PDA). Although these example arrangements are presented in FIG. 1, it is to be understood that they are presented for purposes of illustration only to facilitate description of the invention. Therefore, many other arrangements are possible. For example, the computing device 102 can, alternatively, comprise a notebook computer, Macintosh computer, etc. The printing device 104 can comprise any device that is capable of generating hard copy documents including a photocopier, a facsimile machine, a multifunction peripheral (MFP), etc. Furthermore, the portable computing device 106 can, alternatively, be arranged as a notebook computer, mobile telephone, appropriate smart card, etc. In some embodiments, the computing device 102 and the portable computing device 106 can be the same device such that the computing device 102 is portable.

With further reference to FIG. 1, the system 100 can include a network 108 to which the computing device 102 and/or the printing device 104 is connected. The network 108 typically comprises one or more sub-networks that are communicatively coupled to each other. By way of example, these networks can include one or more local area networks (LANs) and/or wide area networks (WANs). Indeed, in some embodiments, the network 108 may comprise a set of networks that forms part of the Internet. In addition to being linked via the network 108, the computing device 102 and the printing device 104 can be directly connected to each other (not shown). Such an arrangement is likely in a home environment in which the user does not have a home network and instead directly communicates to the printing device 104. In such a scenario, communication can be facilitated with a direct electrical and/or optical connection or through wireless communication.

As is further depicted in FIG. 1, the portable computing device 106 and the printing device 104 can wirelessly communicate with each other. By way of example, such wireless communications can comprise infrared (IR) and/or radio frequency (RF) communications. In the latter case, communications can, for instance, be accomplished using Bluetooth™ and/or IEEE 802.11 protocols. The nature of such communications is described in greater detail below.

Figure 2:
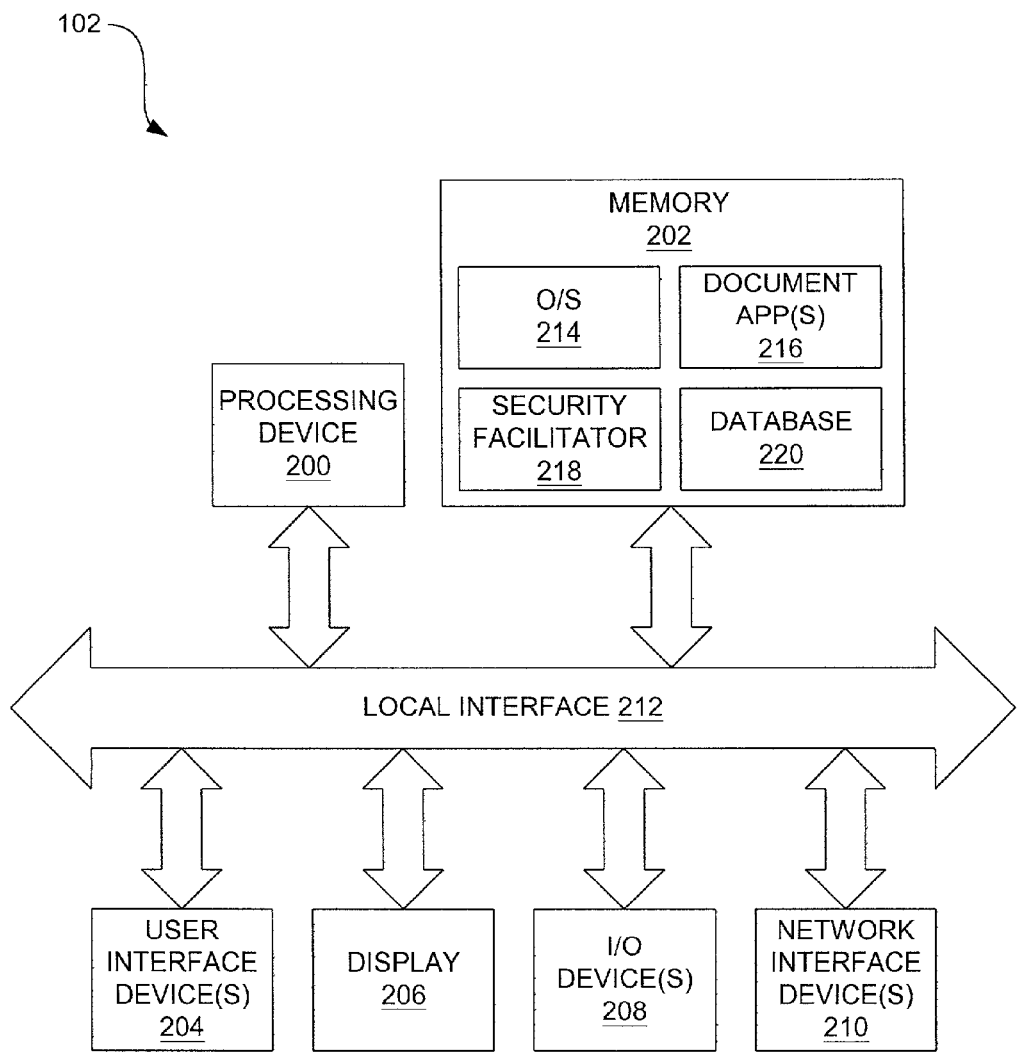
FIG. 2 is a schematic view of a computing device shown in FIG. 1.

FIG. 2 is a schematic view illustrating an example architecture for the computing device 102 shown in FIG. 1. As indicated in FIG. 2, the computing device 102 can comprise a processing device 200, memory 202, one or more user interface devices 204, a display 206, one or more input/output (I/O) devices 208, and one or more networking devices 210, each of which is connected to a local interface 212. The processing device 200 can include any custom made or commercially available processor, a central processing unit (CPU) or an auxiliary processor among several processors associated with the computing device 102, a semiconductor based microprocessor (in the form of a microchip), or a macroprocessor. The memory 202 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 204 comprise those components with which the user can interact with the computing device 102. For example, where the computing device 102 comprises a desktop or notebook computer, these components can comprise a keyboard, mouse, trackball, microphone, etc. The display 206 comprises a device that is used to present visual information to the user. By way of example, the display 206 can be arranged as a cathode ray tube monitor or a plasma screen. The one or more I/O devices 208 are adapted to facilitate communications of the computing device 102 with another device, such as the printing device 104, and may therefore include one or more serial, parallel, small computer system interface (SCSI), universal serial bus (USB), IEEE 1394 (e.g., Firewire™), and/or personal area network (PAN) components.

The network interface devices 210 comprise the various components used to transmit and/or receive data over the network 108. By way of example, the network interface devices 210 include a device that can communicate both inputs and outputs, for instance, a modulator/demodulator (e.g., modem), wireless (e.g., radio frequency (RF)) transceiver, a telephonic interface, a bridge, a router, network card, etc.

The memory 202 normally comprises an operating system 214, one or more document applications 216, a security facilitator 218, and a database 220. The operating system 214 controls the execution of other software and provides scheduling, input-output control, file and data management, memory management, and communication control and related services. The document applications 216 comprise user applications that execute on the computing device 102 and from which document printing jobs can issue and/or with which documents can be identified. By way of example, the document applications 216 can comprise a word processing application, image manager, etc.

Figure 6:
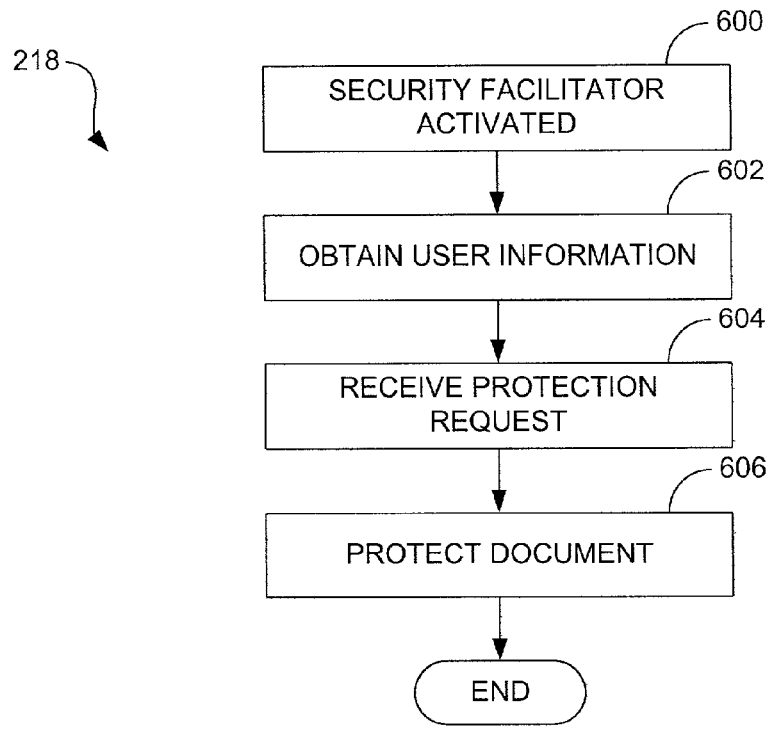
FIG. 6 is a flow diagram that illustrates the operation of a security facilitator of the computing device shown in FIG. 2.

As is discussed in greater detail below with respect to FIG. 6, the security facilitator 218 is configured to provide security for the documents that issue from and/or are identified by the document applications 216 such that only authorized persons may access the documents and, therefore, view their contents. The database 220 provides a storage location for various information that may be needed by the security facilitator 218. For example, the database 220 may store one or more keys that are used to encrypt documents.

Figure 3:
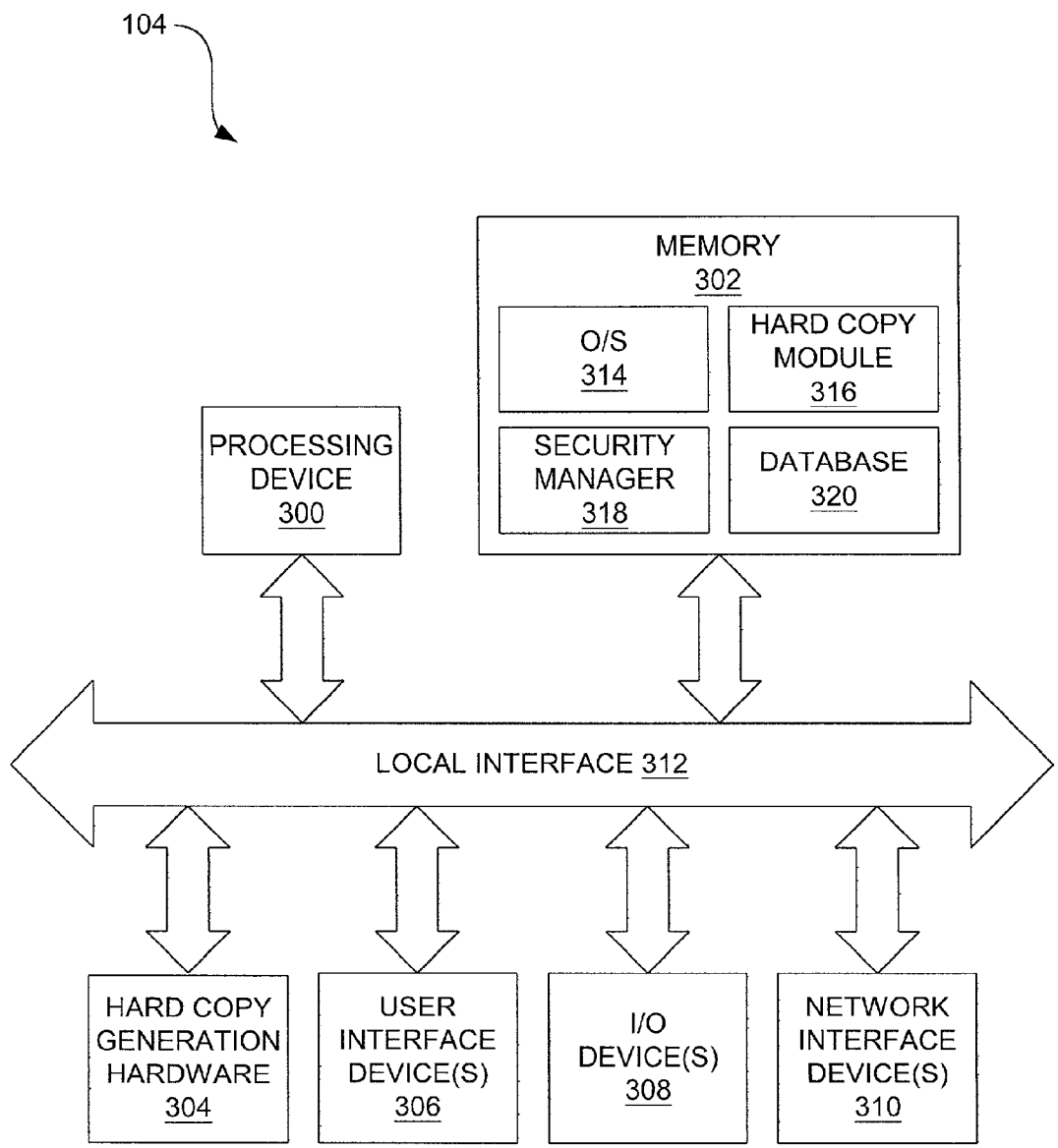
FIG. 3 is a schematic view of a printing device shown in FIG. 1.

FIG. 3 is a schematic view illustrating an example architecture for the printing device 104 shown in FIG. 1. As indicated in FIG. 3, the printing device 104 can comprise a processing device 300, memory 302, hard copy generation hardware 304, one or more user interface devices 306, one or more I/O devices 308, and one or more network interface devices 310. Each of these components is connected to a local interface 312 that, by way of example, comprises one or more internal buses. The processing device 300 is adapted to execute commands stored in memory 302 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the printing device 104.

The hard copy generation hardware 304 comprises the components with which the printing device 104 can generate hard copy documents. For example, the hard copy generation hardware 304 can comprise a print engine that is possible of many different configurations. The one or more user interface devices 306 typically comprise interface tools with which the device settings can be changed and through which the user can communicate commands to the printing device 104. By way of example, the user interface devices 306 comprise one or more function keys and/or buttons with which the operation of the printing device 104 can be controlled, and a display, such as a liquid crystal display (LCD), with which information can be visually communicated to the user and, where the display comprises a touch-sensitive screen, commands can be entered.

As with the I/O devices 208, the I/O devices 308 are adapted to facilitate communications with another device, such as computing devices 102 and 106, and may therefore include one or more serial, parallel, small computer system interface (SCSI), universal serial bus (USB), IEEE 1394 (e.g., Firewire™), and/or personal area network (PAN) components. In addition, where wireless communications are desired, the I/O devices 308 can further include an IR and/or RF transceiver. The network interface devices 310 comprise the various components used to transmit and/or receive data over the network 108 and, for example, include a device that can communicate both inputs and outputs, for instance, a modulator/demodulator (e.g., modem), wireless (e.g., radio frequency (RF)) transceiver, a telephonic interface, a bridge, a router, network card, etc.

The memory 302 includes various software (firmware) programs including an operating system 314, hard copy module 316, and a security manager 318. The operating system 314 contains the various commands used to control the general operation of the printing device 104. The hard copy module 316 comprises commands that control the operation of the hard copy generation hardware 304 so that the device 102 can generate hard copies. The security manager 318 determines the security, if any, of the jobs received by the printing device 104 and, in some arrangements, confirms a user's authorization prior to permitting a document to be printed. The operation of the security manager 318 is described in greater detail below in relation to FIG. 7. In addition to these programs, the memory 302 can further include a database 320 that can be used to store information used by the security manager 318.

Figure 4:
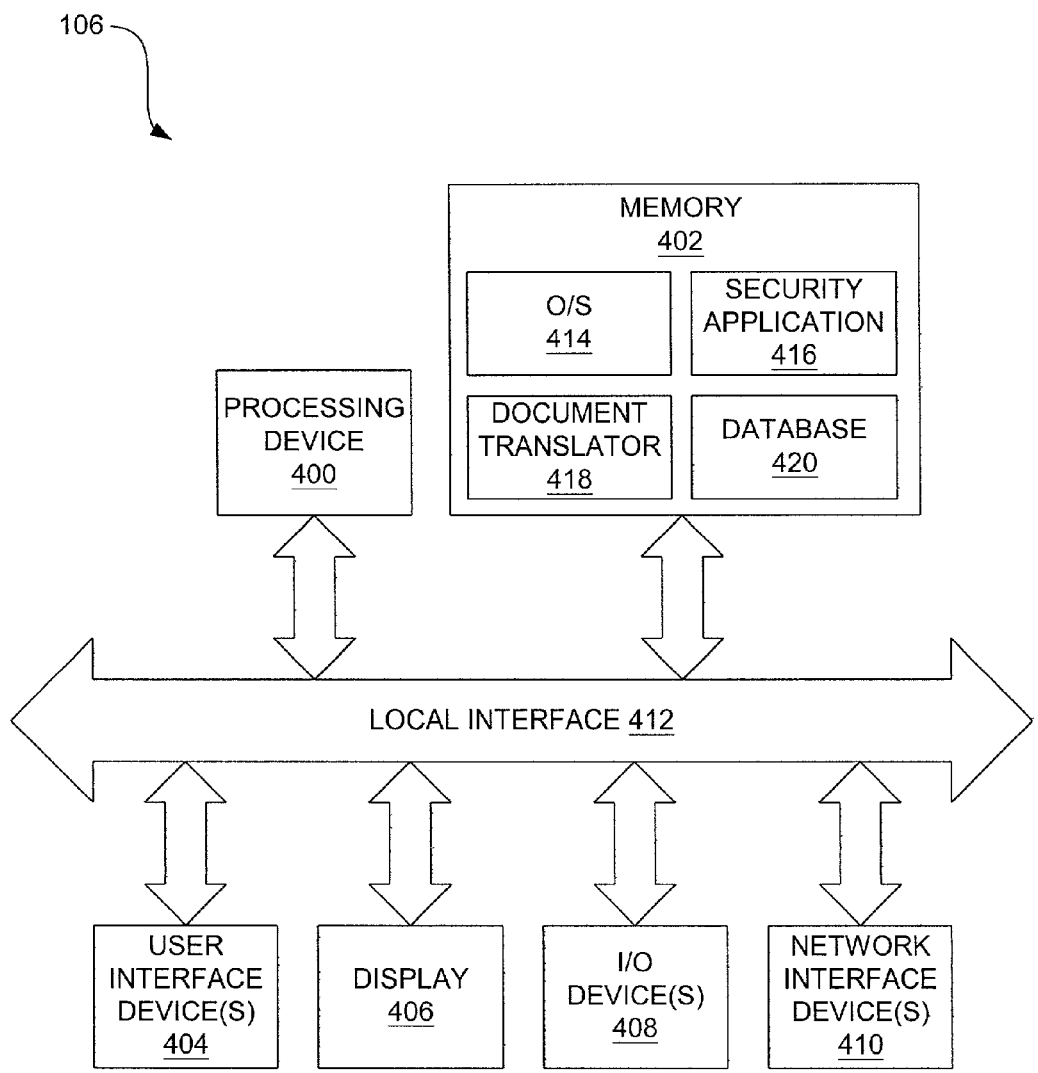
FIG. 4 is a schematic view of a portable computing device shown in FIG. 1.

FIG. 4 is a schematic view illustrating an example architecture for the portable computing device 106 shown in FIG. 1. The configuration of the portable computing device 106 is similar to that of the computing device 102. Indeed, as noted above, the computing device 102 and the portable computing device 106 can, in some circumstances, comprise the same device. Accordingly, a detailed description of the architecture shown in FIG. 4 is not provided herein. Instead, only the components or features not described with relation to FIG. 2 are discussed in any detail.

With reference to FIG. 4, the portable computing device 106 can comprise a processing device 400, memory 402, one or more user interface devices 404, a display 406, one or more input/output (I/O) devices 408, and one or more networking devices 410, and a local interface 412, each of which operates in similar manner to like-named components identified with reference to FIG. 2. The user interface devices 404, like interface devices 306 of the printing device 104, typically comprise interface tools with which the device settings can be changed and through which the user can communicate commands and other information to the device 106. For instance, the user interface devices 404 can comprise one or more function keys and/or buttons, a stylus, and a touch-sensitive pad or screen with which selections, characters, and other information can be entered. The display 406 normally comprises an LCD (e.g., touch-sensitive), and the I/O devices 408 normally include an IR and/or RF transceiver such that, as indicated in FIG. 1, wireless communications can be had with the printing device 104.

As indicated in FIG. 4, the memory 402 can comprise an operating system 414, a security application 416, a document translator 418, and a database 420. The security application 416 facilitates the printing of secure documents and, more particularly, can be used to open documents that have been received by the printing device 104. The document translator 418, where provided, comprises the various software (firmware) that is used to translate the opened documents into a print ready format (e.g., printer control language (PCL), PostScript, etc.) such that, when the document is delivered back to the printing device 104, the printing device will be able to generate a hard copy document. The operation of the security application 416 and the job translator 418 are discussed in greater detail below in relation to FIGS. 7 and 8. The memory 402 can also include a database 420 that can be used to store information that may be needed by the security application 416 in facilitating the printing of documents.

Various software and/or firmware programs have been described herein. It is to be understood that these programs can be stored on any computer-readable medium for use by or in connection with any computer-related system or method. In the context of this document, a computer readable medium is an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, operation of the system will now be discussed. In the discussion that follows, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 5:
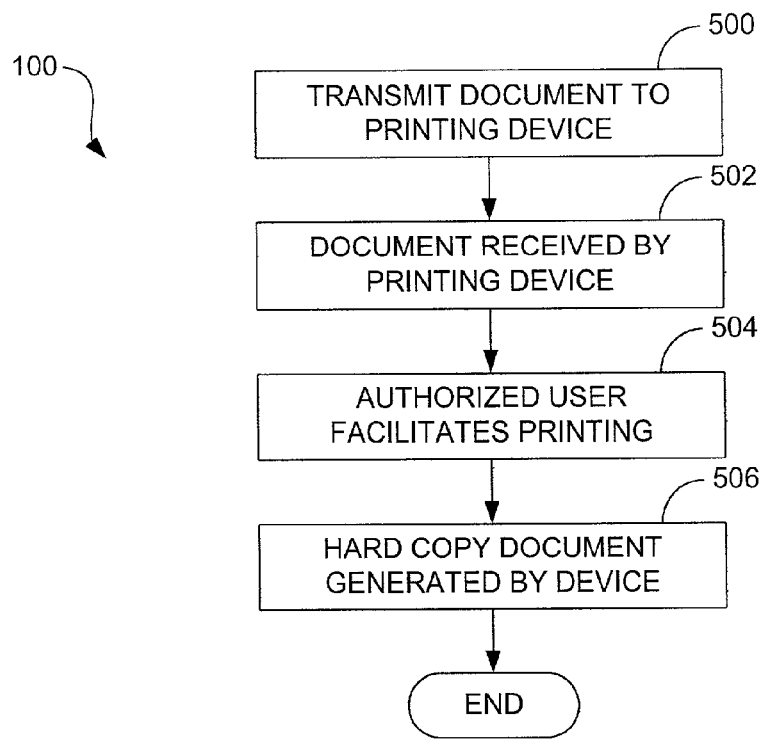
FIG. 5 is a flow diagram that illustrates the general operation of the system shown in FIG. 1.

The general operation of the system 100 is illustrated in FIG. 5. Beginning with block 500 system, operation involves first transmitting a document to be printed to a printing device. In one arrangement, the document is a protected document. In another arrangement, the document is an unprotected, but untranslated (i.e., not in a print ready format) document. In yet a further arrangement, the document is both protected and untranslated. Irrespective of the particular nature of the document, the document is received by the printing device, as indicated in block 502, and held until such time when an authorized user can facilitate its printing as a hard copy document, as indicated in block 504. As is discussed below, this facilitation can comprise unprotecting the document, translating the document, or both. In preferred arrangements, the authorized user facilitates printing of the document when near the printing device so as to reduce the possibility of an unauthorized user accessing a sensitive hard copy document when it is output from the printing device, as indicated in block 506.

Various discrete components of the system 100 can operate in concert to obtain the functionality described above with reference to FIG. 5. Examples of operation of these components are provided below in relation to FIGS. 6-8. Beginning with FIG. 6, an example of operation of the security facilitator 218 of the computing device 102 is described. Operation of the security facilitator 218 normally occurs after a document to be printed has been created, opened, or otherwise identified by the user. By way of example, the document can have been created using one or more of the document applications 216 (e.g., Microsoft Word™). Once the document is in existence, the security facilitator 218 can be activated, as indicated in block 600. This activation can occur in a variety of different ways but typically occurs when a protection request is received with the document application (where the application is so configured) or when a separate security application associated with the security facilitator 218 is initiated by the user. In any case, once the security facilitator 218 is activated, it obtains user information, as indicated in block 602. This user information identifies the user to the security facilitator 218. By way of example, the user information includes a user name that has been entered by the user along with a password at some point in the user session (e.g., when the user first logs on to the computing device 102). With the user identification, the security facilitator 218 can obtain information as to any security attributes (e.g., a secret key) that can be used to protect the document to be printed. By way of example, this information can be obtained by the security facilitator 218 by referencing an appropriate location of the database 220.

At this point, the security facilitator 218 can receive a protection request, as indicated in block 604. This protection request can call for a variety of different forms of document protection. For instance, the protection request can call for encryption of the document. In one example, encryption can implicate an asymmetric (public-key) encryption method, such as pretty good privacy (PGP), in which a public key of an authorized user is used to encrypt the document and the authorized user's private key may be used to decrypt the document. In another example, encryption can implicate a symmetric encryption method in which one key is used to encrypt the document and another key is used by the authorized user to decrypt the document. In a further example, encryption can entail the association of a large prime number with the document (e.g., included in the header) that must be provided to access the document. As will be appreciated by persons having ordinary skill in the art, various other cryptographic methods can be utilized to provide protection for the document, some of which may be preferable over those methods that have been discussed above.

Once the protection request has been received, the security facilitator 218 protects the document in the desired manner, as indicated in block 606. Again, the nature of this protection can take many different forms. Irrespective of the type of protection provided, however, the document is secure in that only authorized persons will be able to access the document. After the document has been protected, flow for the security facilitator 218 is terminated and the protected document can be transmitted to an appropriate printing device (e.g., printing device 104).

It is noted that, although the document to be printed has been described as having been protected prior to being transmitted to the printing device, this "protection" can, alternatively or in addition, comprise modification of the document by the security facilitator 218 such that the document can only be translated into the appropriate print ready format (i.e., printing device language) by a unique translator that, for instance, is only possessed by persons authorized to facilitate printing of sensitive documents. In such a case, flow is similar to that identified above in relation to FIG. 6 except that provision of "protection" comprises modifying the document format so that only users who provide the unique translator will be capable of facilitating printing of the document.

Figure 7:
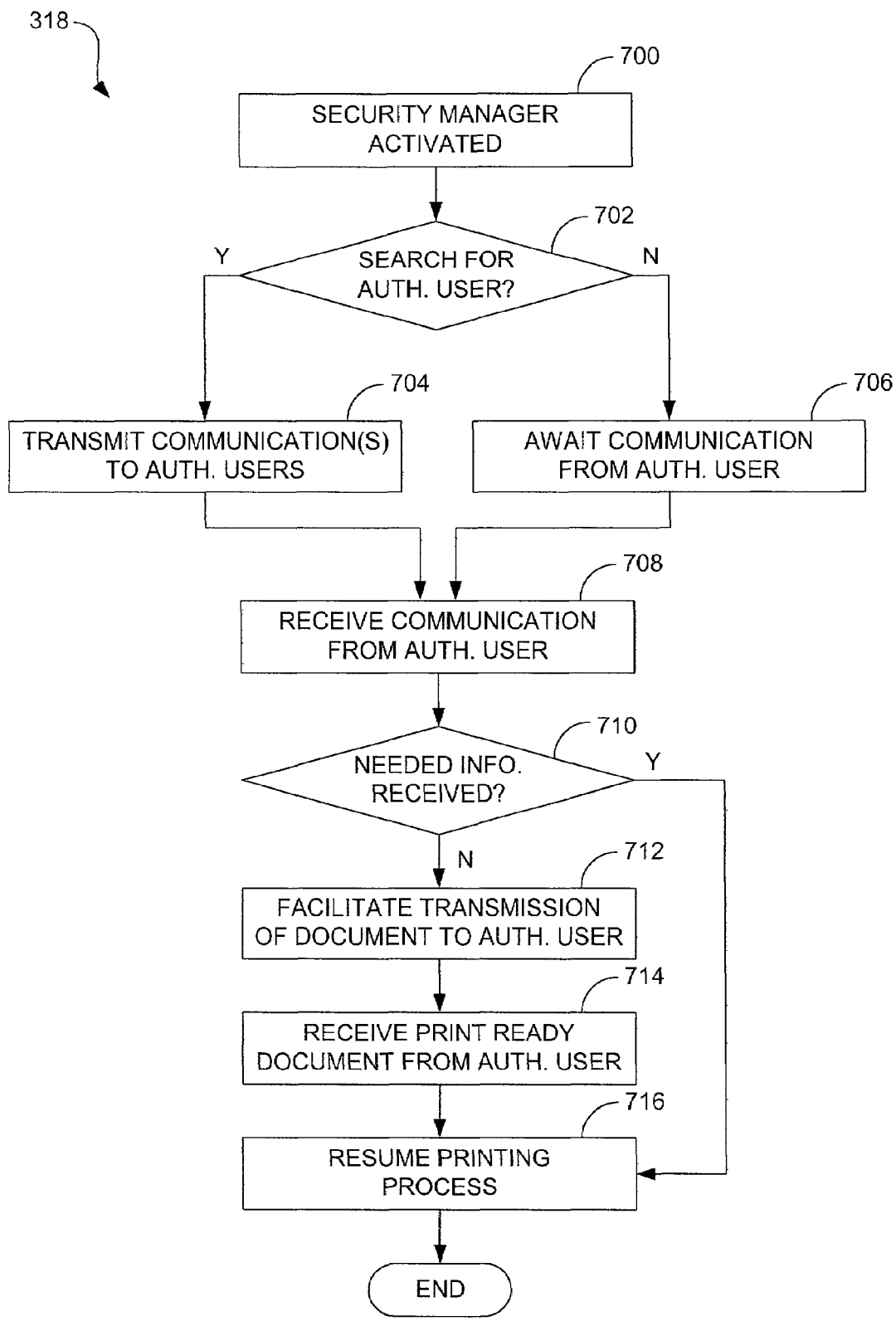
FIG. 7 is a flow diagram that illustrates operation of a security manager of the printing device shown in FIG. 3.

Referring now to FIG. 7, an example of operation for the security manager 318 of the printing device 104 will be discussed. Beginning with block 700, the security manager 318 is first activated. Activation normally occurs when the security manager 318 determines (i.e., is notified or senses) that a document cannot be printed in its present form because, for instance, the document is protected, not in a print ready format, or both. Once activated, the security manager 318 can determine whether to search for an authorized user who can facilitate the printing process, as indicated in decision element 702. If so, flow continues to block 704 at which the security manager 318 transmits communications out toward authorized users. These transmissions preferably comprise periodic wireless transmissions (e.g., pings) to any proximate, authorized portable computing device (e.g., computing device 106) that call for the authorized user to facilitate the printing process. If the security manager 318 is not configured to search for an authorized user, flow continues to block 706 at which the manager awaits a communication from the authorized user. In either case, flow then continues to block 708 at which the security manager 318 receives a communication from the authorized user and, more particularly, from the user's portable computing device 106.

Figure 8:
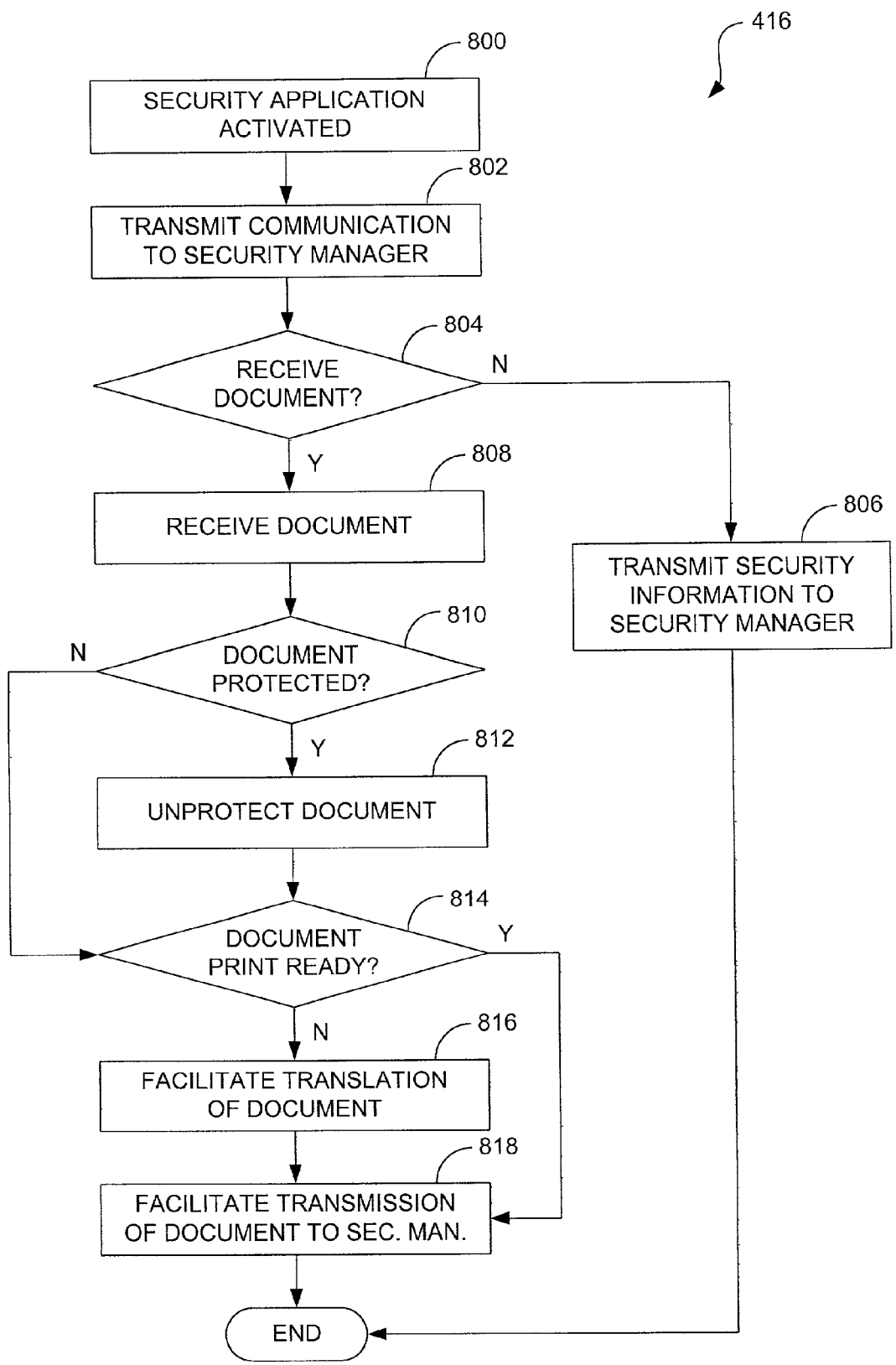
FIG. 8 is a flow diagram that illustrates operation of a security application of the portable computing device shown in FIG. 4.

Referring now to FIG. 8, an example of operation of the security application 416 of the portable computing device 106 will be described. Beginning with block 800, the security application 416 is first activated. This activation can comprise receipt of the communication (e.g., wireless communication) from the security manager 318 of the printing device 104 noted above with respect to FIG. 6, or can comprise a request to send a communication to the security manager 318 that was input by the user. In either case, the portable computing device 106 can next transmit a communication to the security manager 318, as indicated in block 802.

As will be appreciated by persons having ordinary skill in the art, the nature of this communication depends upon the nature of printing process facilitation that is needed. Where the document has been protected in the conventional sense of the term, the transmitted communication can comprise transmission of a key or prime number that is needed to decrypt a document. In another example, the transmitted communication can comprise a request to receive a protected document so that it can be unprotected and/or translated and then provided back to the printing device 104.

With reference to decision element 804, it can then be determined whether the document is to be received by the portable computing device 106. If not, facilitation of the printing process only requires transmission of needed security information (e.g., a key or prime number), as indicated in block 806, for the printing device 104 to print the document. In such a case, the security information can be culled from the database 420 by the security application 416. If, on the other hand, the document is to be received by the portable computing device 106, flow continues on to block 808 at which the document is received. Once the document is received, the security application 416 can facilitate whatever action is needed to provide the printing device 104 with a print ready version of document. Therefore, with reference to decision element 810, it can be determined whether the document is protected (e.g., encrypted). If not, flow continues down to decision element 814 described below. If the document is protected, however, the security application 416 can unprotect the document in the appropriate manner (e.g., by providing a key or prime number), as indicated in block 812.

Referring now to decision element 814, it can then be determined whether the unprotected document is in print ready format. If the document is already in a print ready format, flow continues down to block 818 at which the security application 416 facilitates transmission of the print ready document to the printing device 104. If, on the other hand, the document has not been translated, for example a unique translator is needed to translate the document, flow continues to block 816 at which the security application 416 facilitates translation of the document by, for instance, delivering the document to the document translator 418.

Returning now to FIG. 7, and the operation of the security manager 318 of the printing device 104, the communication received by the authorized user (portable computing device 106) can take a variety of different forms. As noted above, the communication may comprise a key or prime number needed by the security manager 318 to decrypt the document to be printed. In another example, the communication can comprise a request to receive the document so that it can be unprotected and/or translated by the security application 416. Accordingly, with reference to decision element 710, it can be determined whether the information needed by security manager 318 to access to the document has been received. If so, flow continues down to block 716 described below. If not, however, flow continues to block 712 at which the security manager 318 facilitates transmission of the document to the authorized user (portable computing device 106).

At this point, the portable computing device 106, and the security application 416 in particular, can facilitate unprotecting and/or translating of the document in the manner described above with reference to FIG. 8. Once this unprotecting/translating has occurred, the security manager 318 can receive a print ready version of the document, as indicated in block 714 and, as indicated in block 716, resume the printing process such that the hard copy module 316, in conjunction with the hard copy generation hardware 304, can generate a hard copy document for the authorized user to receive.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for facilitating secure printing, comprising:
   receiving with a printer an untranslated document in a non-print ready format to be printed;
   determining on the printer that the document cannot be printed in its present form;
   transmitting the document from the printer to a nearby portable computing device; and
   receiving with the printer a print ready version of the document from the portable computing device.

2. The method of claim 1, wherein transmitting the document comprises wirelessly transmitting the document and wherein receiving a print ready version of the document comprises wirelessly receiving the print ready version of the document.

3. The method of claim 1, wherein the portable computing device is a personal digital assistant, a mobile telephone, or a smart card.

4. A method for facilitating secure printing, comprising:
   receiving with a portable computing device an untranslated document in a non-print ready format from a nearby printing device;
   translating the document into a print ready format on the portable computing device; and
   transmitting the translated document from the portable computing device back to the printing device so that the printing device can generate a hard copy of the document.

5. The method of claim 4, wherein receiving the untranslated document comprises receiving the document via wireless communication and wherein transmitting the translated document comprises transmitting the document via wireless communication.

6. The method of claim 4, wherein the portable computing device is a personal digital assistant, a mobile telephone, or a smart card.

7. A printing device, comprising:
   a processing device; and
   memory including a security manager that is configured to facilitate transmission of an unencrypted document that is in a non-print ready format and therefore cannot be printed in its present form to a nearby portable computing device and further configured to receive a print ready version of the document from the portable computing device.

8. The printing device of claim 7, further comprising a transceiver adapted to facilitate wireless communications between the printing device and the portable computing device.

9. The printing device of claim 7, wherein the portable computing device is a personal digital assistant, a mobile telephone, or a smart card.

10. A portable computing device, comprising:
    a processing device; and
    memory including a document translator that is configured to receive an untranslated document in a non-print ready format transmitted from a nearby printing device, translate the document into a print ready format, and facilitate transmission of the print ready document back to the printing device.

11. The portable computing device of claim 10, further comprising a transceiver adapted to facilitate wireless communications between the computing device and the printing device.

12. The portable computing device of claim 10, wherein the portable computing device is a personal digital assistant, a mobile telephone, or a smart card.

13. A computer-readable medium that stores a computer program that facilitates secure printing, the program comprising:
    logic configured to receive a document to be printed;
    logic configured to determine that the document cannot be printed in its present form;
    logic configured to facilitate transmission of the document to a nearby portable computing device; and
    logic configured to receive a print ready version of the document from the portable computing device.

14. The computer-readable medium of claim 13, wherein the document has not been translated into a print ready format.

15. The computer-readable medium of claim 13, wherein the portable computing device is a personal digital assistant, a mobile telephone, or a smart card.

16. A computer-readable medium that stores a computer program that facilitates secure printing, the program comprising:
    logic configured to identify an untranslated document received by a portable computing device from a nearby printing device;

logic configured to translate the document into a print ready format on the portable computing device; and logic configured to facilitate transmission of the translated document from the portable computing device back to the printing device so that the printing device can generate a hard copy of the document.

17. The computer-readable medium of claim 16, wherein the portable computing device is a personal digital assistant, a mobile telephone, or a smart card.

* * * * *

UNITED STATES PATENT AND TRADEMARK OFFICE
CERTIFICATE OF CORRECTION

| | |
|---|---|
| PATENT NO. | : 7,304,757 B2 |
| APPLICATION NO. | : 10/029458 |
| DATED | : December 4, 2007 |
| INVENTOR(S) | : Travis Parry et al. |

It is certified that error appears in the above-identified patent and that said Letters Patent is hereby corrected as shown below:

In column 9, line 58, in Claim 2, after "receiving" delete "a" and insert -- the --, therefor.

Signed and Sealed this

Seventeenth Day of June, 2008

JON W. DUDAS
*Director of the United States Patent and Trademark Office*